(12) United States Patent
Revol et al.

(10) Patent No.: US 10,946,564 B2
(45) Date of Patent: Mar. 16, 2021

(54) OVERMOULDING AN OPTICAL ELEMENT ON A THERMOPLASTIC FRAME

(71) Applicant: VALEO VISION, Bobigny (FR)

(72) Inventors: Damien Revol, Bobigny (FR); Vincent Penichou, Bobigny (FR); Anthony Lozano, Bobigny (FR)

(73) Assignee: VALEO VISION, Bobigny (FR)

( * ) Notice: Subject to any disclaimer, the term of this patent is extended or adjusted under 35 U.S.C. 154(b) by 235 days.

(21) Appl. No.: 15/951,616

(22) Filed: Apr. 12, 2018

(65) Prior Publication Data

US 2018/0297249 A1    Oct. 18, 2018

(30) Foreign Application Priority Data

Apr. 12, 2017    (FR) ...................................... 17 53222

(51) Int. Cl.
| | | |
|---|---|---|
| *B29C 45/00* | (2006.01) | |
| *F21V 19/00* | (2006.01) | |
| *F21S 41/19* | (2018.01) | |
| *B29C 45/14* | (2006.01) | |
| *F21S 43/19* | (2018.01) | |
| *F21S 41/29* | (2018.01) | |
| *F21S 41/26* | (2018.01) | |
| *B29K 83/00* | (2006.01) | |

(52) U.S. Cl.
CPC .... *B29C 45/0046* (2013.01); *B29C 45/14311* (2013.01); *B29C 45/14655* (2013.01); *F21S 41/192* (2018.01); *F21S 41/295* (2018.01); *F21S 43/195* (2018.01); *F21V 19/007* (2013.01); *B29C 45/14836* (2013.01); *B29C 2045/14327* (2013.01); *B29K 2083/00* (2013.01); *F21S 41/26* (2018.01)

(58) Field of Classification Search
CPC ........... B29C 45/0046; B29C 45/14311; B29C 45/14655; F21V 19/007; F21S 41/192; F21S 41/295; F21S 43/195
See application file for complete search history.

(56) References Cited

U.S. PATENT DOCUMENTS

| | | | |
|---|---|---|---|
| 7,234,851 B2 * | 6/2007 | Goraguer .......... | B29C 45/14434 362/507 |
| 2007/0117248 A1 | 5/2007 | Kunze et al. | |
| 2009/0260871 A1 | 10/2009 | Weber | |
| 2014/0109382 A1 | 4/2014 | Weber | |

FOREIGN PATENT DOCUMENTS

WO    WO 2009/129123 A1    10/2009

OTHER PUBLICATIONS

French Preliminary Search Report dated Aug. 11, 2017 in French Application 17 53222 filed on Apr. 12, 2017 (with English Translation of Categories of Cited Documents).

* cited by examiner

*Primary Examiner* — Thomas M Sember
(74) *Attorney, Agent, or Firm* — Oblon, McClelland, Maier & Neustadt, L.L.P.

(57) ABSTRACT

An optical assembly of a light-emitting module, especially of a lighting and/or signalling module, for a motor vehicle, including an optical element, a frame; the optical element being overmoulded on the frame, the frame being shaped so as to make a mechanical attachment between the frame and the optical element following the overmoulding of the optical element on the frame.

13 Claims, 4 Drawing Sheets

OVERMOULDING AN OPTICAL ELEMENT ON A THERMOPLASTIC FRAME

The present invention relates to the field of assembling an element on a frame that may act as a support for said element, and more particularly to the assembling of an element on a frame by overmoulding. The element to be assembled on the frame may be an optical element such as a lens for example.

The present invention finds applications in the motor vehicle field, especially in the field of motor vehicle projection devices in lighting and/or signalling applications. A lens overmoulded on a frame may thus constitute an element of a motor vehicle projection device.

Known methods for overmoulding an element on a frame make provision for the assembling, as a single part, of an element and of a frame acting as support therefor. The objective of such methods is to obtain a single part from two separate parts.

However, these methods make no provision for preventing displacements of the overmoulded element with respect to the frame acting as support therefor.

Indeed, once the element is overmoulded on the frame, a clearance between the overmoulded element and the associated frame, or a deformation of one of these elements, may exist or be created, due to a temperature difference or mechanical wear.

Consequently, degrees of freedom may remain in the connection between the overmoulded element and frame acting as support therefor.

Furthermore, certain materials that deform with heat such as plastics for example may create additional movements of the overmoulded element with respect to the frame, or even lead to a rupture of the assembly. Indeed, the temperature variations may deform both the overmoulded element and the frame acting as support.

There is therefore a need to limit or even prevent the movement of an overmoulded element with respect to a frame acting as support therefor and thus to ensure a holding of the overmoulded element and associated frame assembly.

The present invention improves the situation.

A first aspect of the invention relates to an optical assembly (100) of a light-emitting module, especially of a lighting and/or signalling module, in particular for a motor vehicle, comprising:
  an optical element (102);
  a frame (101);
  said optical element being overmoulded on the frame,
  said frame being shaped so as to make a mechanical attachment between the frame and the optical element following the overmoulding of the optical element on the frame.

An "optical element" is understood to mean an element that makes it possible to modify the trajectory of light rays or the properties of the light. For example, an optical element may correspond to a mirror or a lens made of thermoplastic material such as polycarbonate (PC), polymethyl methacrylate (PMMA), cyclic olefin copolymer (COC), cyclic olefin polymer (COP) and silicone.

A "frame" is understood to mean an element acting as support for the optical element.

"Overmoulding" is understood to mean the action that consists in carrying out a moulding of the optical element directly on the frame. Several overmoulding techniques exist. For example in plastics processing, overmoulding consists in injecting plastic on an element acting as support.

The support element may be formed of various materials: metal, plastic or ceramic for example.

Thus, the optical element and the frame form a single part and the optical element adopts the geometry of the frame. This eliminates the use of interface parts and makes it possible to avoid multiple assembly steps. The number of parts of the final product is reduced and there is no visible joint between the optical element and the frame. This also makes it possible to obtain a variety of larger shapes for the optical element.

According to one embodiment of the invention, at least one contact surface of the frame with the optical element may comprise at least one hole, in which the hole makes the mechanical attachment between the frame and the optical element following the overmoulding of the optical element on the frame.

Thus, the physical adhesion between the frame and the overmoulded optical element is strengthened. The degrees of freedom corresponding to the independent relative movements between the optical element and the frame are limited.

According to one embodiment of the invention, said at least one hole comprises a through-hole so that, following the overmoulding, the optical element partially surrounds the frame.

Thus, the use of a through-hole makes it possible to limit the movements of the optical element with respect to the frame. Indeed, in the case of an optical element made of silicone, the optical element has a tendency to move. This phenomenon is due to the fact that silicone is a material which remains flexible and struggles to maintain its geometry. These movements may also be caused by different expansion coefficients during exposure to heat.

According to one embodiment of the invention, the through-hole may have a constant cross section.

Thus, the operation that consists in making the holes does not introduce difficulties.

According to one embodiment of the invention, said at least one hole may have a non-constant increasing cross section.

Thus, the mechanical adhesion between the optical element and the frame is strengthened.

According to one embodiment of the invention, said at least one hole may have a T-shaped non-constant cross section.

Alternatively, the non-constant increasing cross section may have a linear profile.

According to one embodiment of the invention, the frame may comprise a central hole arranged so as to enable light to pass through the optical element.

Thus, during the overmoulding of the optical element on the frame, the optical element becomes lodged in the central hole.

According to one embodiment of the invention, the frame may comprise at least eight holes distributed substantially uniformly around the central hole.

Thus, the connection of the optical element on the frame is strengthened.

According to one embodiment of the invention, the frame may comprise at least sixteen holes distributed substantially uniformly around the central hole.

Thus, the connection of the optical element on the frame is strengthened.

According to one embodiment of the invention, the frame may comprise at least twenty holes distributed substantially uniformly around the central hole.

Thus, the connection of the optical element on the frame is strengthened.

According to one embodiment of the invention, at least one contact surface of the frame with the optical element may comprise at least one asperity, in which the asperity makes the mechanical attachment between the frame and the optical element following the overmoulding of the optical element on the frame.

Thus, the mechanical adhesion between the optical element and the frame is strengthened.

According to one embodiment of the invention, said frame may be made of a thermoplastic material and the optical element may be made of silicone.

Thus, the mechanical connection between the optical element and the frame is strengthened. Indeed, in the case where the frame is made of thermoplastic material and the optical element is made of silicone or of a different thermoplastic, there is little chemical adhesion. Furthermore, the silicone has a high thermal expansion coefficient and the thermoplastic materials also deform as a function of the temperature. This may lead to a certain mechanical clearance between the two elements: frame and optical element. Consequently, the fact of overmoulding the optical element made of silicone on a frame made of thermoplastic material, where the frame is shaped to produce a mechanical attachment, makes it possible to limit the movements within the assembly.

According to one embodiment, said frame may further be connected to a second optical element, so as to carry out an optical function by arranging the second optical element relative to the optical element.

A second aspect of the invention relates to a process for manufacturing an assembly of an optical element, from a material such as polycarbonate (PC), polymethyl methacrylate (PMMA), cyclic olefin copolymer (COC), cyclic olefin polymer (COP) or silicone with a frame, in which the process comprises the steps of:

producing the frame;
overmoulding the optical element on said moulded frame;
the frame being manufactured so as to make a mechanical attachment between the frame and the optical element during the step of overmoulding the optical element on the frame.

According to one embodiment, the production of the frame comprises the drilling of at least one hole, in which the hole makes the mechanical attachment between the frame and the optical element following the overmoulding of the optical element on the frame.

According to one embodiment, said at least one hole comprises a through-hole so that, following the overmoulding, the optical element partially surrounds the frame.

According to one embodiment, said through-hole has a constant cross section.

According to one embodiment, said at least one hole has a non-constant increasing cross section.

According to one embodiment, said at least one hole has a T-shaped non-constant cross section.

According to one embodiment, the non-constant increasing cross section has a linear profile.

According to one embodiment, the production of the frame further comprises the drilling of a central hole arranged so as to enable light to pass through the optical element.

According to one embodiment, the production of the frame further comprises the drilling of at least eight holes distributed substantially uniformly around the central hole.

According to one embodiment, the production of the frame comprises the drilling of at least sixteen holes distributed substantially uniformly around the central hole.

According to one embodiment, the production of the frame comprises the drilling of at least twenty holes distributed substantially uniformly around the central hole.

According to one embodiment, the production of the frame is carried out using a thermoplastic material and the overmoulding of said optical element on said frame is carried out using a silicone material.

According to one embodiment, said process may further comprise a step of connecting a second optical element to said frame, so as to carry out an optical function by arranging the second optical element relative to the optical element.

A third aspect of the invention relates to a light-emitting module comprising an optical assembly (100), in particular for a motor vehicle, comprising:

an optical element (102);
a frame (101);
said optical element being overmoulded on the frame,
said frame being shaped so as to make a mechanical attachment between the frame and the optical element following the overmoulding of the optical element on the frame.

A fourth aspect of the invention relates to a light-emitting device comprising a light-emitting module and/or assembly as mentioned above.

A fifth aspect of the invention relates to a vehicle comprising a light-limiting module and/or light-emitting device and/or assembly as mentioned previously.

A light-emitting device may be a headlamp or a rear lamp or else be a lighting device suitable for the interior lighting of the motor vehicle.

Other features and advantages of the invention will become apparent on examining the detailed description below, and the appended drawings in which.

Figure 1:
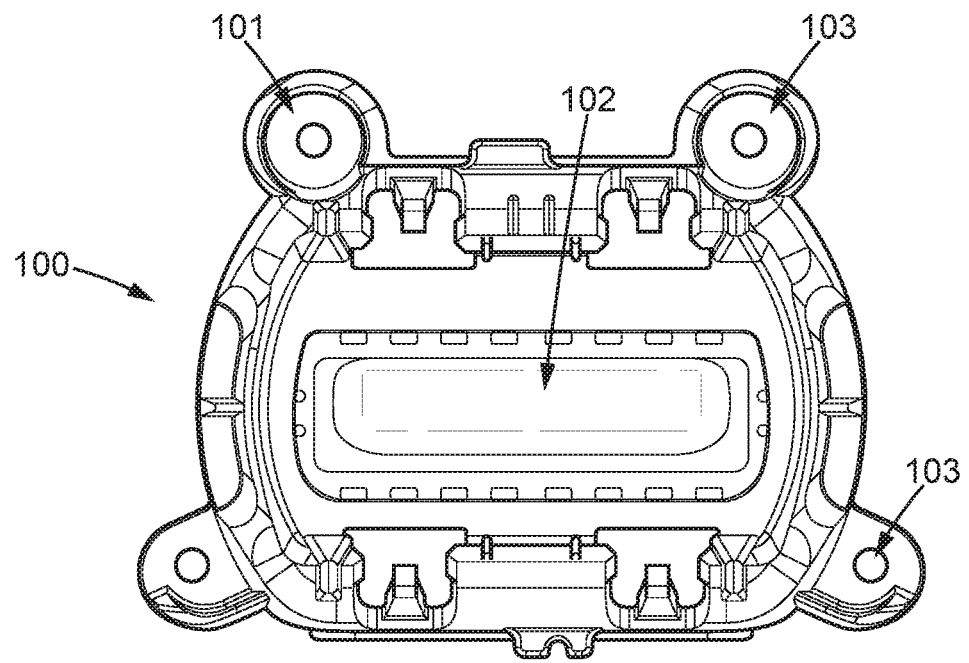
FIG. 1 illustrates an assembly, according to one embodiment of the invention.

FIG. 1 represents an assembly 100 comprising an optical element 102 and a frame 101 acting as support for the optical element 102. The optical element 102 is preferably made of silicone and may for example be a lens. No limitation is attached to the optical function fulfilled by the optical element 102. The optical element 102 is overmoulded on the frame 101 so as to form a single part: the assembly 100.

Advantageously, the frame 101 may be provided with a central hole around which the optical element 102 is overmoulded in order to allow incident light to pass through the optical element 102. The frame may have fastening supports 103 that make it possible to integrate the assembly 100 in a light-emitting module, for example a lighting and/or signalling module for a motor vehicle. The shape and the positioning of the fastening supports 103 in FIG. 1 are only one example of the fastening of the assembly 100.

The shape of the frame 101 according to the invention enables the assembling with the optical element 102. Indeed, it will be seen hereinbelow that the design of the frame 101 has an influence on the fastening of the optical element 102 following the overmoulding of the optical element 102 on the frame 101.

The frame 101 acting as support for the optical element 102 may be moulded, for example in the case where the frame 101 is made of thermoplastic material. However, no limitation is attached to the way in which the frame is produced.

The design of a mould for the frame 101 having the geometry and the features described below and enabling the fastening of the optical element 102 following the overmoulding step, may be created beforehand. The frame 101 may also be a metal part, produced for example by machining.

FIG. 1 more particularly represents a view in a plane perpendicular to light rays that reach the optical element 102, of the assembly 100 comprising the frame 101 and the optical element 102.

Figure 2:
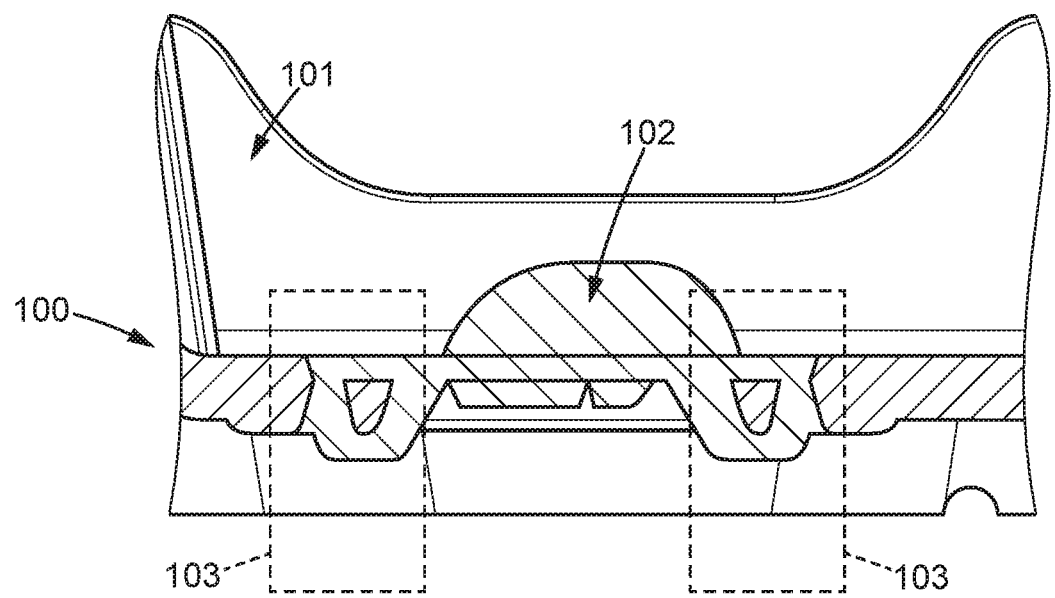
FIG. 2 represents a cross-sectional view of an assembly, according to one embodiment of the invention.

FIG. 2 represents a cross-sectional view of the assembly 100 comprising a frame 101 and an optical element 102, according to one embodiment of the invention. More particularly, FIG. 2 represents a cross-sectional view resulting from a three-dimensional representation of the assembly 100 along a plane perpendicular to the plane of FIG. 1. In FIG. 2 it is seen that the optical element 102 completely surrounds the frame at the locations 103. The locations 103 correspond to through-holes in the frame 101. Indeed, during the overmoulding of the optical element 102 on the frame 101, the overmoulded optical element 102 comes to completely surround the frame 101 at the locations 103. The purpose of this is to strengthen the mechanical adhesion between the frame 101 and the optical element 102, and to prevent the optical element 102 from becoming detached from the frame 101. The way in which the optical element 102 comes to surround the frame 101 at the two locations 103 is identical. However, nothing decrees that the design of the frame has two identical through-holes. The elements 103 from FIG. 2 can be considered as mechanical attachment within the meaning of the invention.

It is seen in FIG. 2 that there is no visible fastening between the optical element 102 and the frame 101, the assembly 100 indeed forms one single part.

Figure 3:
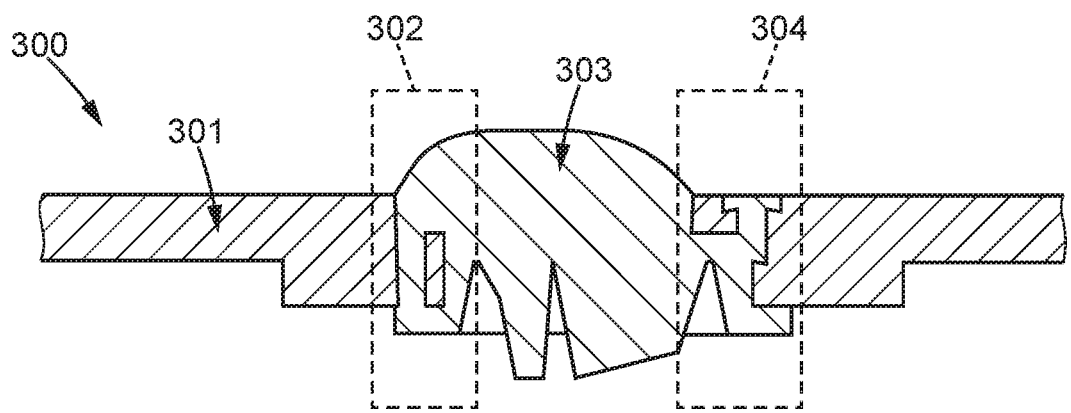
FIG. 3 represents a cross-sectional view of an assembly, according to one embodiment of the invention.

FIG. 3 represents a cross-sectional view of an assembly 300, according to one embodiment of the invention. The assembly 300 comprises an optical element 303 and a frame 301 acting as support therefor. The elements 302 and 304 from FIG. 3 represent two types of mechanical attachments produced according to a different arrangement. Indeed, in the same way as in FIG. 2, the mechanical attachment 302 consists in completely surrounding the frame 301 with the optical element 303, which corresponds to a through-hole.

The mechanical attachment 304 is different from the mechanical attachment 302. Indeed, for the mechanical attachment 304, the frame 301 is shaped so that the optical element 303 penetrates the frame 301 according to the geometry illustrated in FIG. 3. Consequently, the shape of the frame 301 is produced beforehand so as to enable such a mechanical attachment and thus to provide the optical element 303 with the space required within the frame 301 in order to be inserted therein. In the example from FIG. 3, the mechanical attachments differ within the assembly. Each of these mechanical attachments fulfils a different function. The mechanical attachments 302 and 304 may each prevent a different movement and thus maintain the contact and limit the mechanical clearance between the optical element 303 and the frame 301 so as to form a single part: the assembly 300.

Several parameters are taken into account for the geometry and the positioning of the mechanical attachments, such as the temperature for example. Indeed, for an optical element made of silicone, the thermal expansion coefficient is high. A frame made of thermoplastic material is also influenced by temperature variations. The temperature variation deforms both the frame and the optical element. It is consequently preferable to take this factor into account in order to avoid the thermal deformation of the optical element and also of the frame acting as support therefor. For example, in the case of integrating such an assembly within a motor vehicle projection device, the temperatures may be subjected to variations from −40° C. to +120° C.

Furthermore, in the case of a frame made of thermoplastic material and of an optical element made of silicone or different thermoplastic material, there is a low chemical adhesion between the two elements. It is therefore advantageous to impose a certain geometry on the frame acting as support for the optical element in order to produce mechanical attachments that prevent any unexpected movement, as is provided for by the present invention.

Figure 4A:
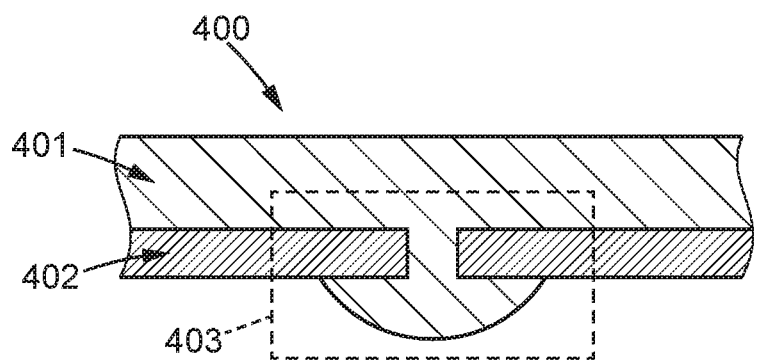
FIGS. 4A, 4B and 4C represent several cross-sectional views, according to various embodiments of the invention.
Figure 4B:
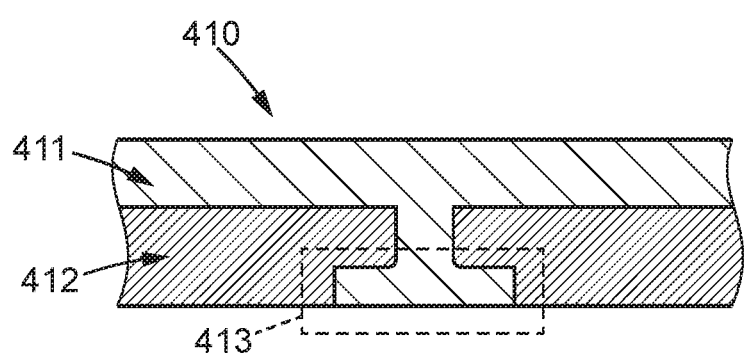
Figure 4C:
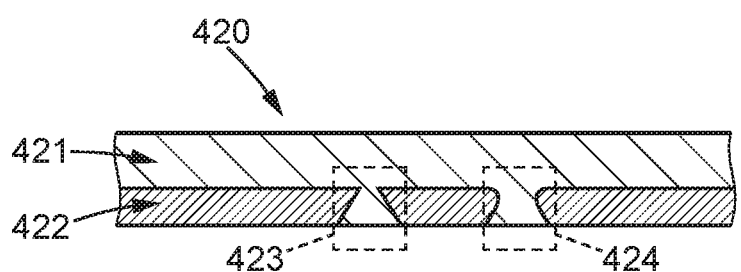

FIGS. 4A to 4C illustrate mechanical attachments between optical element and frame according to embodiments of the invention. Only the mechanical attachment is represented each time, and it will be understood that only a portion of the assembly according to the invention is thus represented.

FIG. 4A represents a cross-sectional view of a mechanical attachment according to one embodiment of the invention. The assembly 400 comprises a frame 402 and an optical element 401. A mechanical attachment 403 enabling contact to be maintained between the optical element 401 and the frame 402 is also seen. This mechanical attachment 403 is produced using a through-hole having a constant cross section within the frame 402, it being possible for the optical element 401 to thus pass completely through the frame 402.

In FIG. 4A it is observed that the mechanical attachment 403 differs from the mechanical attachments represented in the previous figures. Varying the geometry and the features of the frame 402 allows multiple possibilities regarding the design of the optical element and also the design of the mechanical attachments. Indeed, during the overmoulding, the optical element 401 adopts the geometry of the frame 402.

FIG. 4B represents a cross-sectional view of a mechanical attachment 413 according to one embodiment of the invention. The assembly 410 comprises a frame 412 and an optical element 411. The mechanical attachment 413 enables contact to be maintained between the optical element 411 and the frame 412. The mechanical attachment 413 corresponds to a hole having a non-constant cross section. The hole represented in FIG. 4B is a blind hole, but the invention also makes provision for the use of a through-hole having a non-constant cross section. The cross section of the hole within the frame 412 is increasing, in the shape of a T. The contact surfaces between the optical element and the frame differ from the previous figures.

It is possible to design, on computer-aided design software, the contact surfaces between an optical element and a frame acting as support therefor in order to characterize this set as an assembly. Indeed, once the contact surfaces and also the contours of the optical element and of the frame are drawn in the plan, it is possible, by extrusion, to obtain a model representing the assembly in three dimensions. This model of the three-dimensional assembly may then be used for the manufacture.

FIG. 4C represents a cross-sectional view of mechanical attachments 423 and 424 according to one embodiment of the invention. The assembly 420 comprises a frame 422 and an optical element 421. The mechanical attachment 423 corresponds to a hole having a non-constant cross section within the frame 422. The hole corresponding to the mechanical attachment 423 is a blind hole in FIG. 4C, but the invention also makes provision for the use of a through-hole having a non-constant cross section. More specifically, the mechanical attachment 423 corresponds to a hole, the cross section of which is increasing with a linear profile.

The mechanical attachment 424 corresponds to a hole having a non-constant cross section within the frame 422. The hole corresponding to the mechanical attachment 424 is a blind hole in FIG. 4C, but the invention also makes provision for the use of a through-hole having a non-constant cross section. The cross section of the hole corresponding to the mechanical attachment 424 does not have an exactly linear profile. The cross section starts with a parabolic profile followed by a linear profile.

Thus, depending on the application, on the type of material used and on the imposed stresses, the present invention enables a high degree of precision regarding the type and the number of mechanical attachments for the design of the frame.

Figure 5A:
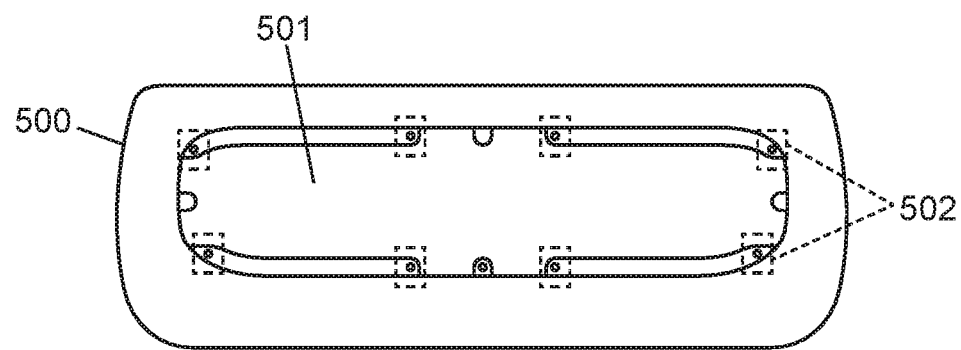
FIGS. 5A, 5B and 5C represent several different embodiments of the invention.

FIG. 5A represents an embodiment of an assembly according to the invention. More specifically, FIG. 5A represents a frame 500 acting as support for the overmoulding of an optical element, not represented in the figure. The frame 500 comprises a central hole 501 enabling incident light to pass through the optical element when the latter is overmoulded on the frame 500. The frame 500 may comprise at least eight holes 502, in particular eight holes, uniformly distributed around the central hole 501 and enabling the optical element to be held once overmoulded on the frame. The holes 502 may be of substantially identical sizes and may be positioned on tabs belonging to the frame 500. The holes 502 are made on the frame 500 prior to the step of overmoulding the optical element on the frame 500.

Figure 5B:
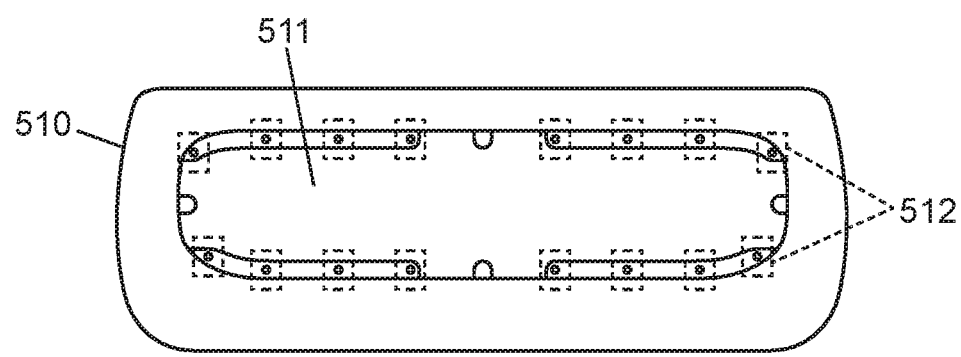

FIG. 5B represents an embodiment of an assembly according to the invention. More specifically, FIG. 5B represents a frame 510 acting as support for the overmoulding of an optical element, not represented in the figure. The frame 510 comprises a central hole 511 enabling incident light to pass through the optical element when the latter is overmoulded on the frame 510. The frame 510 may comprise at least sixteen holes, in particular sixteen holes, uniformly distributed around the central hole 511 and enabling the optical element to be held once overmoulded on the frame. The holes 512 may be of substantially identical sizes and may be positioned on tabs belonging to the frame 510. Increasing the number of holes within the frame makes it possible to increase the mechanical adhesion between the frame and the optical element once the latter is overmoulded on the frame.

Figure 5C:
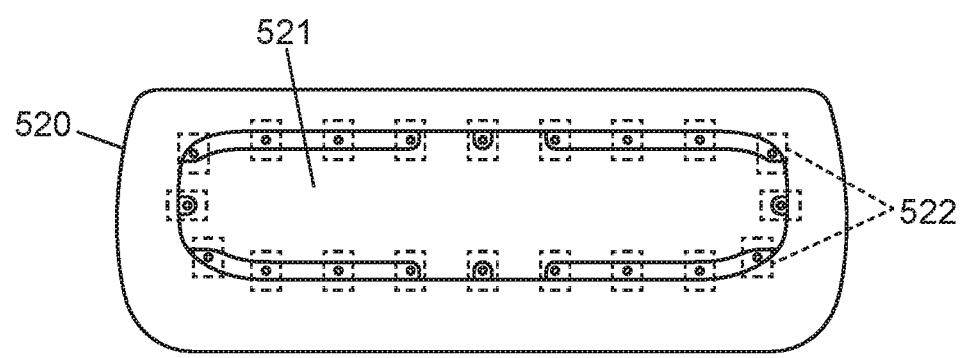

FIG. 5C represents an embodiment of an assembly according to the invention. More specifically, FIG. 5C represents a frame 520 acting as support for the overmoulding of an optical element, not represented in the figure. The frame 520 comprises a central hole 521 enabling incident light to pass through the optical element when the latter is overmoulded on the frame 520. The frame 520 may comprise at least twenty holes, in particular twenty holes 521 uniformly distributed around the central hole 521 and enabling the optical element to be held once overmoulded on the frame. The holes 522 may not all be of substantially identical sizes. Indeed, sixteen holes 522 may be of substantially identical sizes, similarly to FIG. 5B and four additional holes 522 of smaller sizes are inserted on tabs that are also of smaller size.

Figure 6:
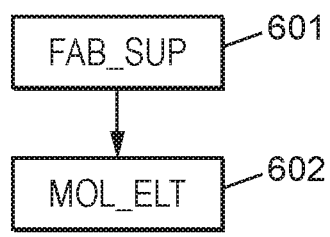
FIG. 6 is a diagram illustrating the steps of a process according to one embodiment of the invention.

FIG. 6 represents a diagram illustrating the steps of a process according to one embodiment of the invention. More specifically, FIG. 6 comprises two steps 601 and 602 of a process for manufacturing an assembly of an optical element, preferably made of silicone with a frame acting as support therefor. The first step 601 (FAB_SUP) corresponds to the manufacture of the frame. The frame may also be considered to be a support. The frame may be manufactured by moulding in the case of a frame made of thermoplastic material. The frame may also be a metal element and therefore be manufactured by machining. The step 602 (MOL_ELT) corresponds to a step of overmoulding the optical element on the frame. The objective of this step is to form, from two separate parts which are the optical element and the frame, a single part: the assembly. Irrespective of the process for manufacturing the frame during step 601, the frame is shaped so as to make a mechanical attachment between the frame and the optical element during the overmoulding of the optical element on the frame. The frame is therefore designed with a particular geometry so as to provide the mechanical attachments for the optical element as a function of the application of said assembly.

Of course, the invention is not limited to the embodiments described above and provided solely by way of example. It encompasses various modifications, alternative forms and other variants that a person skilled in the art could envisage within the context of the present invention and especially all combinations of the various embodiments described above.

The invention claimed is:

1. Optical assembly of a light-emitting module, for a motor vehicle, comprising:
   an optical element;
   a frame;
   said optical element being overmoulded on the frame,
   said frame comprising at least one contact surface configured to contact the optical element, wherein the contact surface includes a through hole adjacent to an edge of the frame such that a material of the optical element penetrates the through-hole and partially surrounds the edge so as to make a mechanical attachment between the frame and the optical element following the overmoulding of the optical element on the frame.

2. Assembly according to claim 1, wherein the frame comprises a central hole arranged so as to enable light to pass through the optical element.

3. Assembly according to claim 2, wherein the frame comprises at least eight holes distributed substantially uniformly around the central hole.

4. Assembly according to claim 3, wherein the frame comprises at least sixteen holes distributed substantially uniformly around the central hole.

5. Assembly according to claim 4, wherein the frame comprises at least twenty holes distributed substantially uniformly around the central hole.

6. Assembly according to claim 1, wherein at least one contact surface of the frame with the optical element comprises at least one asperity, wherein the asperity makes the mechanical attachment between the frame and the optical element following the overmoulding of the optical element on the frame.

7. Assembly according to claim 1, wherein said frame is made of a thermoplastic material and the optical element is made of silicone.

8. Assembly according to claim 1, wherein said frame is further connected to a second optical element, so as to carry out an optical function by arranging the second optical element relative to the optical element.

9. Assembly according to claim 1, wherein the frame comprises a central hole arranged so as to enable light to pass through the optical element.

10. Assembly according to claim 1, wherein the frame comprises at least eight holes distributed substantially uniformly around the central hole.

11. Assembly according to claim 1, wherein at least one contact surface of the frame with the optical element comprises at least one asperity, wherein the asperity makes the mechanical attachment between the frame and the optical element following the overmoulding of the optical element on the frame.

12. Assembly according to claim 1, wherein said frame is made of a thermoplastic material and the optical element is made of silicone.

13. Assembly according to claim 1, wherein said frame is further connected to a second optical element, so as to carry out an optical function by arranging the second optical element relative to the optical element.

* * * * *